UNITED STATES PATENT OFFICE.

ALFRED H. COWLES, OF SEWAREN, NEW JERSEY, ASSIGNOR TO THE ELECTRIC SMELTING AND ALUMINUM COMPANY, OF SEWAREN, NEW JERSEY.

PROCESS FOR PRODUCING HYDROCHLORIC ACID AND ALKALI-SILICO-ALUMINATES.

1,040,977. Specification of Letters Patent. Patented Oct. 8, 1912.

No Drawing. Original application filed October 10, 1911, Serial No. 653,876. Divided and this application filed January 23, 1912. Serial No. 672,823.

*To all whom it may concern:*

Be it known that I, ALFRED H. COWLES, a citizen of the United States, and a resident of Sewaren, in the county of Middlesex and State of New Jersey, have invented certain new and useful Improvements in the Process for Producing Hydrochloric Acid and Alkali-Silico-Aluminates, of which the following is a specification.

The present invention relates to a process for manufacturing hydrochloric acid and alkali-silico-aluminate.

The object of the present invention is to furnish a process by means of which with a furnace of given capacity frequent runs may be made, resulting in uniform products of high grade, thereby changing the former impracticable and uncommercial experiments into a practicable and economical process.

This application is a divisional of my former application, Ser. No. 653,876, filed October 10th, 1911.

It has long been known that water vapor will decompose alkali chlorid in the presence of alumina or silica at elevated temperatures. There is formed an alkali oxid which combines with the silica or alumina, or both, as the case may be, while the freed chlorin unites with the water vapor, to form hydrochloric acid gas. Various attempts have been made to use this process commercially. Among others, Dr. Adolf Kayser, in British Patent No. 11,493, of 1887, proposed decomposing clay and salt by steam in a down-draft furnace, and there appears a method for carrying this reaction into effect in U. S. Patent No. 375,409, of January 10, 1888. All these attempts have been productive of no commercial success, as can be seen from Lunge, *Sulphuric Acid and Alkalis*, Vol. III, 3d edition, New York, 1911, pp. 240 and 250. The cause of non-success in previous processes lies in the fact that there was incomplete conversion of the charge mixture, for the reason that the conversion took place only on the surface, and penetrated the block with too great slowness to permit success. The result was a too weak hydrochloric acid and an unutilizable aluminate or silicate. Briquets made of salt and clay are not sufficiently porous to permit the reaction to work commercially and economically, as I and others have discovered.

My improved process relates to the preparation of the charge mixture and to the treatment in the furnace of said mixture.

The essential feature of my mixture is, that it shall be thoroughly porous, and this porosity can be attained in various ways. I may take an intimate mixture (preferably not in a plastic state) composed of, say, 30% to 65% bauxite (preferably the non-ferruginous type) and make it porous or spongy by one of the methods described below, or a similar one, and use it in the form of bricks, or shavings, or lumps of any desired shape the essential feature of my invention being the sponginess or porosity of the mass, allowing free access of the combustion gases and of the steam and air to all parts of the mixture. Or, I may form my mixture of clay, alumina and silica, (or non-ferruginous compounds of alumina and silica) together with an alkali chlorid and a substance such as gelatinous silica which when the water of hydration has completely passed off, will evolve a small amount of gas (vapor of water) and render the above mixture porous, and spongy, and therefore easily accessible to the furnace gases and to the steam and air in the furnace.

There are various methods by which the porosity may be imparted to the charge mixture. One method consists in mixing with the silico-aluminous materials and the alkali chlorid some substance such as hydrated gelatin that on drying, or on subjection to heat, shall be partially driven off as gas, causing expansion, or which shall under heat in the absence of vapor of water shrink, or largely pass off in the form of gas. Carbon may be mixed in a finely divided state with the other materials, and when they are subjected to heat the carbon will form carbonic oxid and disappear, leaving the charge mixture spongy or porous. This is the method covered by my copending application, Ser. No. 521,692, filed October 8th 1909. My present process is not limited to carbon as a porosity producing body, nor is it necessary, according to this present invention that the porosity be produced after the charge is inserted into the furnace. Since filing Ser. No. 521,692, I have found that I can obtain commercial results with bodies that are sufficiently porous when inserted into the furnace. Another method consists in combining with the clay (alumina, silica) and alkali chlorid small amounts of materials that on mixing or heating produce carbon dioxid throughout the plastic mass. Thus, one may mix with the materials tartaric acid, and carbonate or bicarbonate of soda. Of course, care must be taken not to use any acid or material which will contaminate either the hydrochloric acid to be manufactured or the material remaining as alkali-silico-aluminate.

To form my charge mixture, I mix together compositions containing silica, alumina and alkali chlorid, either sodium or potassium chlorid, and to these I add the materials designed to disappear and leave the mass porous. This must not be any substance which, if it comes in contact with the hydrochloric acid will contaminate the same. The solid materials forming the charge are preferably mixed together in a well ground condition and I generally subject them in the form of briquets, sheets, or other convenient shape to a drying out before inserting them into the furnace. These briquets can be made by the ordinary briquetting methods or by hand.

To obtain sponginess when material is mixed in the body of the mass, I find a good composition to be the following: clay (alumina, silica) 15% to 55%; alkali chlorid, 30% to 55%, and a quantity of the material designed to produce porosity, say, tartaric acid, or carbonate of soda, said amount being dependent upon the temperature, the make up of the charge, and the degree of porosity required, good results being obtained when the porosity producing body amounts to 3% to 15% of the charge mixture. Gelatin or glue may be added to the mixture of silico-aluminous material and the salt, which upon addition of water expands and on heating or drying contracts to small volume, thus leaving the mass porous. The charge is subjected in the furnace to a temperature of 1700 to 2400 degrees Fahrenheit. The reaction begins at a comparatively low temperature. It proceeds slowly at first, and it is only when we reach 1700 degrees, with a mixture containing about 32 parts alumina, 46 parts silica and 70 parts salt that the reaction is rapid. With this mixture the product formed maintains, up to 2000 degrees F., its original shape (hollow brick, if that was the shape) without melting. The temperature of operation depends upon the relative proportions of alumina and silica in the mixture. If alumina predominates, the temperature is higher, if silica is more abundant, the temperature at which melting occurs is lower. Although a new crystalline structure is given the final product, the process is one that can best be carried on without fusion liquefaction. The charge mixture in the shape of a porous mass comprising alkali chlorid mixed with aluminous, or silico-aluminous material is now ready to be subjected to the second step of the process. The charge mixture is fed into a furnace where it is exposed to the action of heat, while being acted upon by steam and air, or steam alone (preferably when carbon is absent from the porous charge mixture), which is forced into the furnace and by degrees penetrates the mixture. The furnace employed may be of any suitable kind, such as a down-draft, or a muffle, or a reverberatory furnace, though I now prefer a furnace of the tunnel type. The steam acting alone, or in conjunction with air and combustion gases, upon the mixture decomposes the alkali chlorid, the chlorin thereof uniting with the hydrogen and passing off to the condensing chambers in the form of hydrochloric acid and vapor of water, the rest of the charge remaining behind under the form of alkali-silico-aluminate.

It is a well-known physical fact that all bodies are to a certain extent porous, but that is not the kind of porosity required by my process. The process calls for an artificial porosity purposely produced, and sufficient to allow the gases free access to all parts of the masses in the charge, thus greatly accelerating the conversion, or chemical action as regards the results formerly attained and reducing the amount of inert gases to such a degree that efficient condensation can be effected.

Having thus fully set forth my process and the manner in which it is to be carried out, what I claim, is:—

1. The process of producing hydrochloric acid and alkali-silico-aluminate, which comprises forming a porous mixture of clay and alkali chlorid, subjecting the said mixture to the action of steam and air at high temperatures, and collecting and condensing the hydrochloric acid and watery vapor given off.

2. The process of producing hydrochloric acid and alkali-silico-aluminate, which comprises forming a porous mixture of clay and alkali chlorid, subjecting the said mixture to the action of steam at high temperature, and collecting and condensing the hydrochloric acid and watery vapor given off.

3. The process of manufacturing hydrochloric acid and alkali-silico-aluminate, which comprises combining with an intimate mixture of alkali chlorid and clay a material adapted to disappear and leave the mass porous, treating the material to make it porous, subjecting the porous mass thus produced to the action of steam and air at high temperature, and collecting the hydrochloric acid and watery vapor thus produced.

4. The process of manufacturing hydrochloric acid and alkali-silico-aluminate, which comprises forming a mixture of alkali-chlorid and aluminous material, rendering the mass chemically porous and subjecting the said mass to the action of steam and air at high temperatures.

Signed at Washington in the District of Columbia this twenty-second day of January A. D. 1912.

ALFRED H. COWLES.

Witnesses:
    ALBERT STETSON,
    LOUIS LAUBHEIMER.